US010743548B2

(12) United States Patent
Huang

(10) Patent No.: US 10,743,548 B2
(45) Date of Patent: *Aug. 18, 2020

(54) FOOD BUN WITH FORMED CAVITY

(71) Applicant: Yu Jane Huang, Beverly Hills, CA (US)

(72) Inventor: Yu Jane Huang, Beverly Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/149,991

(22) Filed: Oct. 2, 2018

(65) Prior Publication Data

US 2020/0015485 A1    Jan. 16, 2020

Related U.S. Application Data

(63) Continuation-in-part of application No. 16/032,643, filed on Jul. 11, 2018, now Pat. No. 10,219,521.

(51) Int. Cl.
*A21B 5/02* (2006.01)
*A21D 8/06* (2006.01)
*A21B 3/13* (2006.01)

(52) U.S. Cl.
CPC .............. *A21B 5/02* (2013.01); *A21B 3/135* (2013.01); *A21D 8/06* (2013.01)

(58) Field of Classification Search
None
See application file for complete search history.

(56) References Cited

U.S. PATENT DOCUMENTS

| 3,950,563 | A | 4/1976 | Wheaton |
| 4,065,581 | A | 12/1977 | Heiderpriem |
| 4,214,517 | A | 6/1980 | Caldwell |
| 5,000,084 | A | 3/1991 | Walliker |
| D755,468 | S | 5/2016 | Elliot |
| 2012/0201927 | A1 | 8/2012 | Meikle |

FOREIGN PATENT DOCUMENTS

| DE | 19820055 | 11/1999 |
| GB | 2062436 | 5/1981 |
| GB | 2203380 | 10/1988 |
| GB | 2302256 | 1/1997 |
| GB | 2401301 | 10/2004 |
| WO | 2004098295 | 11/2004 |

*Primary Examiner* — Patricia A George
(74) *Attorney, Agent, or Firm* — Fish IP Law, LLP

(57) ABSTRACT

Food products, apparatus, systems and methods in which a pocketed bun is produced by supplying compressed air into a portion of bread dough to produce an air pocket, cooking the portion to produce an at least partially cooked bun, and cutting the bun into at least two pieces, with each piece having a cavity. Air can be delivered directly inside the portion of bread dough through a tube or to an expandable object (e.g., a balloon). Preferably, the portion of bread dough is placed into an expandable mold controlled by at least an arm operated by a processor. Batches of pocketed buns can be produced by utilizing a device having multiple molds inside a chamber, and multiple stacked chambers or a shelf with multiple floors.

16 Claims, 5 Drawing Sheets

FOOD BUN WITH FORMED CAVITY

CROSS-REFERENCE TO RELATED APPLICATION

This application claims priority to, and is a continuation in part (CIP) of, U.S. Utility application Ser. No. 16/032,643, titled "Food Bun With Formed Cavity" by the same inventor, filed on Jul. 11, 2018, which is incorporated herein by reference in its entirety.

FIELD OF THE INVENTION

The field of the invention is food products.

BACKGROUND

The following description includes information that may be useful in understanding the present invention. It is not an admission that any of the information provided herein is prior art or relevant to the presently claimed invention, or that any publication specifically or implicitly referenced is prior art.

Traditional hamburgers and sandwiches have two pieces of bread with fillings in between. Due to the open-sided design, fillings easily drip or fall out, potentially spilling out onto the surrounding environment, including the consumer's hands and clothing. This is especially problematic for juicy or over-sized fillings.

Various embodiments are known in the prior art in which cavities are formed within the bread of a bun. However, the known methods of making the cavities are either not well-described, or are problematic. For example, GB2401301 (Petrou) teaches a bun with a pocket opening at the top. There is, however, no disclosure about how to manufacture the pocket.

GB2302256 (Anders) teaches a bun that is cut in half horizontally, and a pocket is formed in both top and bottom halves by pressing a hard object into the cut surfaces of the two halves. GB2062436 (La Charite) teaches forming a recess in an elongated piece of bread by impaling the bread roll onto a spike. These methods are all considered to be suboptimal because they necessarily sacrifice the soft texture of the bun, since the recess is formed by compression.

Others teach using a mold or a cooking device that defines both an outer shape of the bun, and a recess with an opening on top. See e.g., U.S. Pat. No. 3,950,563 (Wheaton), U.S. Pat. No. 4,065,581 (Heiderpriem), U.S. Pat. No. 4,214,517 (Caldwell), and WO2004098295 (Andersen). Since these methods confine the dough in the mold as it is cooking, rising of the dough during baking is limited by the volume of the mold, which precludes producing a bun with a naturally-formed dome shape and a preferred texture. Moreover, the number of buns made during each batch is limited to the number of molds, which might not be suitable for large-scale production.

Thus, there is still a need for systems, devices, and methods for producing a pocketed bun without using compression or confining the bread dough to a mold with a fixed volume.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

The inventive subject matter provides food products, apparatus, systems and methods in which a pocketed bun is produced by supplying compressed air into a portion of bread dough to produce an air pocket, cooking the portion of bread dough to produce an at least partially cooked bun, and cutting the bun into at least two pieces, with each piece having a cavity that is at least partially formed from the air pocket.

In some embodiments, air can be directly delivered inside a portion of bread dough through a tube to produce an air pocket without using any additional object. In other embodiments, air is delivered into a balloon or other expandable object that has been placed inside a portion of bread dough. The air inside the balloon or expandable object is still considered an air pocket.

In some embodiments, a portion of bread dough is placed into an expandable mold prior to the step of supplying air. It is contemplated that one or more (preferably two, four, or six) arms are used to control the expansion of the mold. It is further contemplated that a processor (e.g., a computer) is used to operate at least one arm. An air compressor can be used to compress ambient atmospheric air for use in the step of supplying air. Alternatively, compressed air can be supplied from a gas cylinder that has compressed air (e.g., nitrogen, carbon dioxide, or atmospheric air) in it ready for use.

The step of supplying air can occur entirely before the step of cooking, entirely during the step of cooking, or at least partially during the step of cooking. The bread dough can be cooked in any suitable manner (e.g., by baking or steaming) to produce a bun. It is contemplated that tubes, balloons, or other expandable objects can be removed before, during, or after cooking. After the bread dough is cooked to produce a bun, the bun is cut into at least two halves, with each half having a cavity that is at least partially formed due to the delivery of compressed air.

As an example, a method of producing a pocketed bun comprises placing a balloon inside a portion of bread dough, inflating the balloon, cooking the portion of bread dough to produce a bun that is least partially cooked, deflating the balloon and removing the balloon from the bun, and cutting the bun into at least two pieces, with each piece having a cavity.

The inventive subject matter also includes devices for producing pocketed buns in the methods explained above. Preferred embodiments comprise an air source (e.g., air compressor or gas cylinder), an expandable mold, a tube supplying air to the expandable mold from the air source, and a heat source that is configured to provide dough cooking temperatures inside the expandable mold. Preferably, the expansion of the volume of the mold can be controlled by at least one arm. Devices can have multiple units for simultaneously producing multiple pocketed buns. Such devices comprise multiple levels, with each level having a plurality of molds. A heat source is strategically positioned at a bottom level, since heat (e.g., hot air or hot steam) travels up naturally.

Various objects, features, aspects and advantages of the inventive subject matter will become more apparent from the following detailed description of preferred embodi-

DETAILED DESCRIPTION

Figure 1:
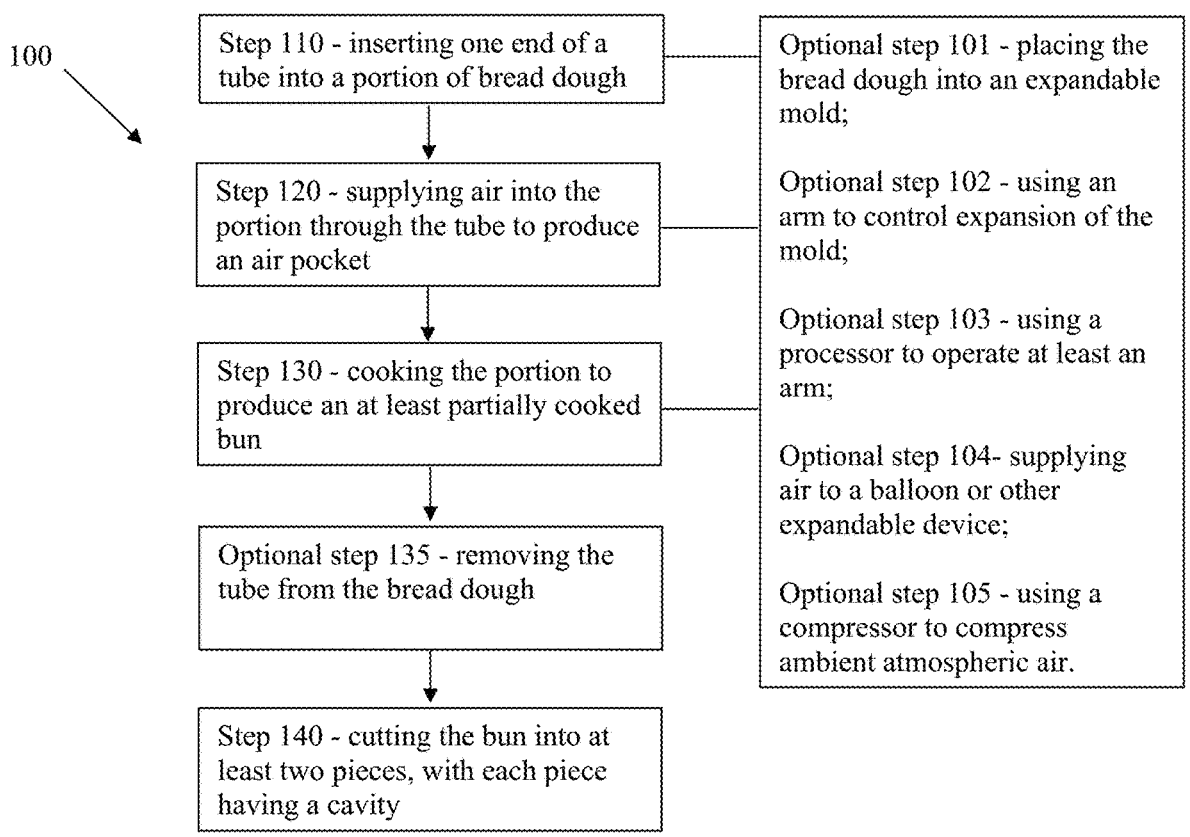
FIG. 1 is a flowchart depicting contemplated steps in preferred methods of producing a pocketed bread bun.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

As used herein interchangeably, the term "bun" or "roll" means a piece of bread that is made by cooking a portion of bread dough.

As shown in FIG. 1, a preferred set of contemplated methods 100 for making a pocketed bread bun includes at least four main steps:

Step 110—inserting one end of a tube into a portion of bread dough;

Step 120—supplying air into the portion through the tube to produce an air pocket;

Step 130—cooking the portion to produce an at least partially cooked bun;

Step 140—cutting the bun into at least a first piece having a first cavity and a second piece having a second cavity.

Optional step 135 includes removing the tube from the bread dough before step 140. Other optional steps include optional step 101—placing the bread dough into an expandable mold; optional step 102—using an arm to control expansion of the mold; optional step 103—using a processor to operate at least an arm; optional step 104—supplying air to a balloon or other expandable device; and optional step 105—using a compressor to compress ambient atmospheric air. These optional steps (101-104) can be performed before, during, or after steps 110-130.

In step 110, one end of a tube is placed inside an amount of bread dough. The tube can be inserted into a portion of dough in any suitable manner, by hand or by machine. The dough can be made of any material that is suitable for producing a bun. Contemplated ingredients include flour, water, oil, and optionally one or more other ingredients typically included in bread making, including for example, egg, salt, sugar, butter, milk, buttermilk, cream, honey, yeast, and baking soda. Contemplated flours include wheat, corn, rye, bean, chickpea, buckwheat, cornmeal, potato, potato starch, rice, and any combinations of these. Contemplated flours can also be gluten-free. In preferred embodiments, the portion of bread dough comprises at least 2% oil (by weight) to increase its elasticity to help prevent rupture of dough and air leakage.

In step 120, air is supplied into the portion of bread dough through the tube to produce an air pocket. Preferably, the temperature of the air and the bread dough is at least 30° C., to increase the elasticity of the bread dough. In optional step 105, an air compressor is used to compress ambient atmospheric air for use in the step 120. Alternatively, compressed air can be supplied from a gas cylinder with compressed air (nitrogen, carbon dioxide, or atmospheric air) ready for use. It is contemplated that compressed air is used in a range of pressures from high-pressures up to 750 psi and also at lower pressures of 15 psi. Ideally, air is purified (e.g., filtered) to rid of dust, bacteria, and other debris and pollutants before the air is used to form an air pocket inside the bread dough.

In optional step 101, the bread dough is placed into an expandable mold, preferably prior to the step 120 of supplying air into the portion. In optional step 102, one or more (preferably two, four, or six) arms are used to control the expansion of the mold. Contemplated arms include mechanical rod capable of extending and contracting or springs. In optional step 103, a processor, for example, a computer, is used to operate the arm to control the expansion of the mold.

In optional step 104, air is supplied into a balloon (or other expandable object) that has been placed inside a portion of bread dough. The air inside the balloon or expandable object is still considered an air pocket. In preferred embodiments, the air pocket is substantially spherical. In other embodiments, the air pocket has an eccentricity of at least 2:1. Preferably, the air pocket has a volume of at least 100 cm$^2$. Alternatively or additionally, the air pocket has a volume at least 40% of a volume of the bun, including the air pocket.

In step 130, the portion of dough is cooked to produce an at least partially cooked bun. The bread dough can be cooked by baking, steaming, frying, or any other suitable cooking methods to produce a bun. In preferred embodiments, the dough is baked in an oven at temperatures of less than 250° C., for 15-20 min. Excessively high temperatures and prolong time are avoided to prevent excessive crusting and bubbling. In preferred embodiments, cooking is performed while having the tube inside the portion of dough. When cooked, buns can assume any shape or form of the mold. Preferred buns have a substantially spherical shape, with a diameter of at least 5 cm, such that the final product would have a cavity large enough to hold fillings of a typical hamburger or sandwich. Contemplated preferred final products have a diameter of at least 5 cm and as long as 20 cm.

In optional step 135, the tube is removed from bun before the step of 140. In step 140, the bun is cut into at least two pieces. In preferred embodiments, the bun is cut significantly off center, such that the cavity in one portion of the bun has a volume at least 50% larger than the volume of the cavity in the mating portion of the bun. More preferably, the cavity in one portion of the bun has a volume at least twice as large as the volume of the cavity in the mating portion of the bun.

Figure 2:
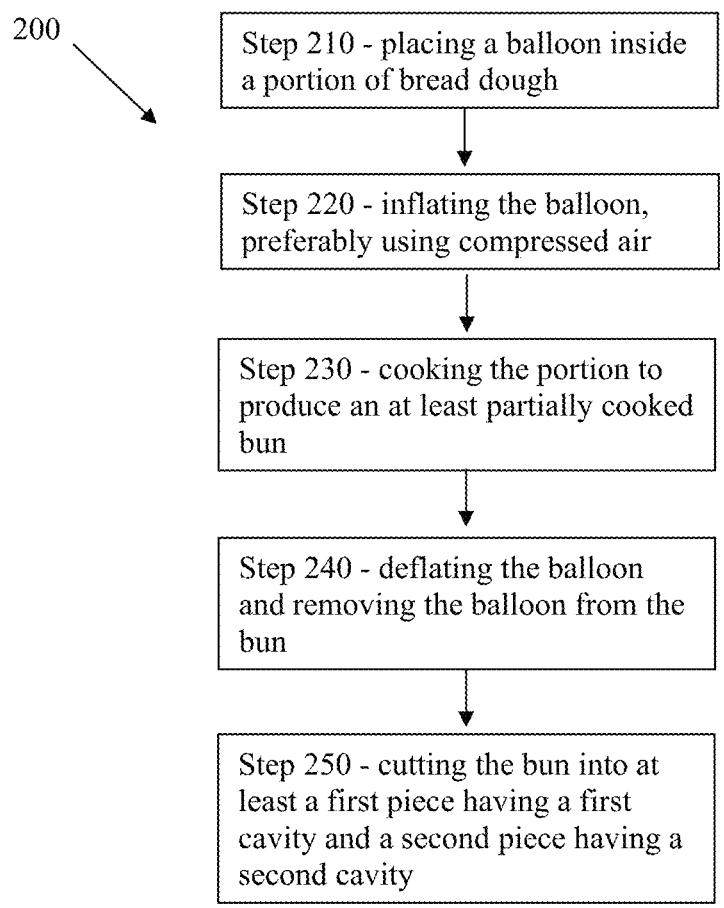
FIG. 2 is a flowchart depicting contemplated steps in a preferred method of producing a pocketed bread bun, using a balloon.

As shown in FIG. 2, a preferred set of contemplated methods 200 for making a pocketed bread bun with a balloon includes five main steps:

Step 210—placing a balloon inside a portion of bread dough;

Step 220—inflating the balloon, preferably using compressed air;

Step 230—cooking the portion to produce an at least partially cooked bun;

Step 240—deflating the balloon and removing the balloon from the bun;

Step 250—cutting the bun into at least a first piece having a first cavity and a second piece having a second cavity.

Figure 3:
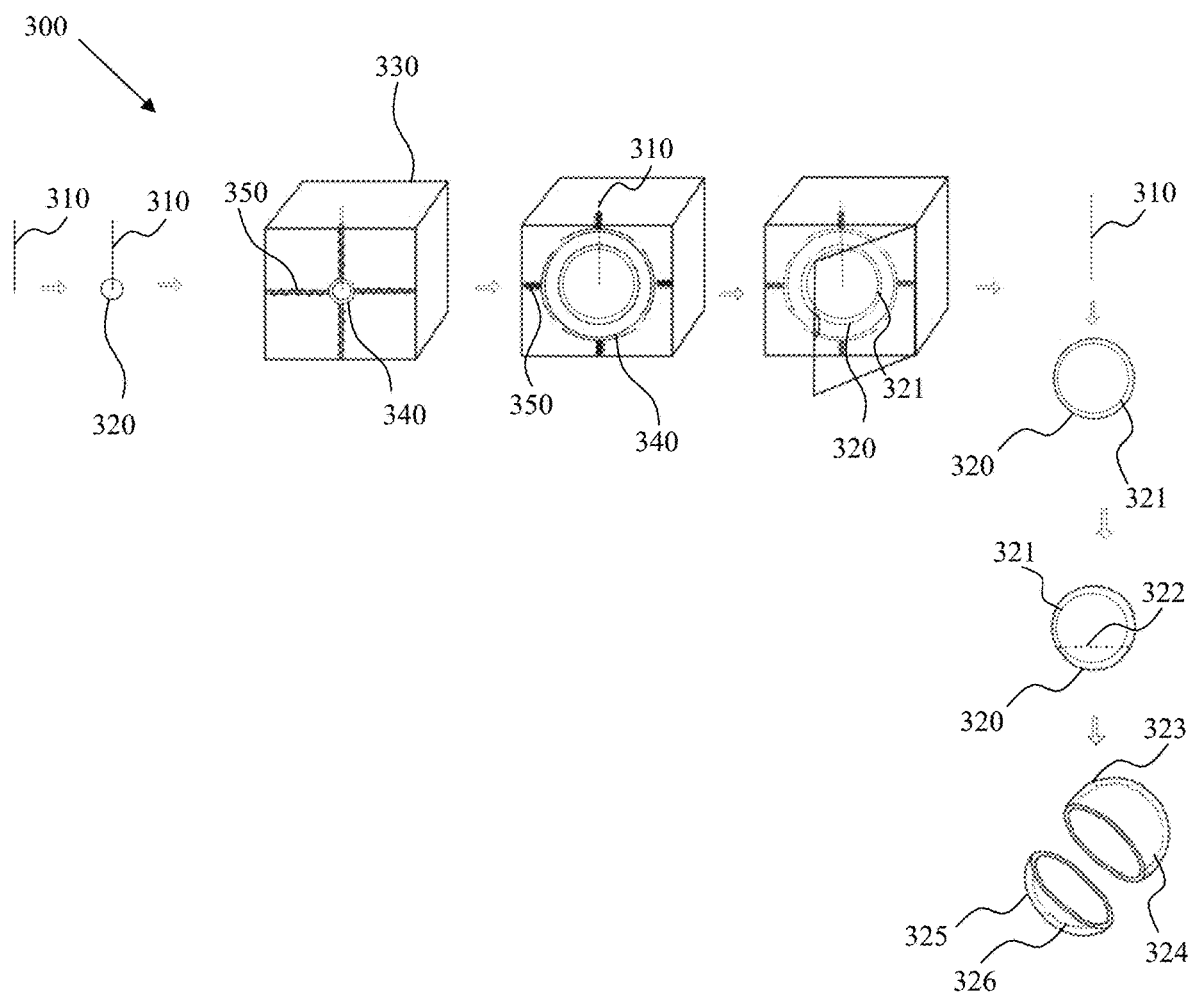
FIG. 3 shows an embodiment of a device that can be used to produce a pocketed bread bun.

FIG. 3 shows an embodiment of a device 300 that can be used to produce a pocketed bread bun. A tube 310 is inserted into a portion of bread dough 320, preferably to the center of the bread dough 320. The device 300 comprises a housing 330 that has an expandable mold 340 and at least one mechanical arm 350 connected to the mold 340. The portion of bread dough 320 is placed inside the mold 340 that is inside the housing 330. Alternatively, one end of the tube 310 is located inside the mold 340 before a portion of dough is placed inside the mold 340, and the tube 310 can be inserted into the portion 320 while the portion 320 is placed inside the mold 340.

As compressed air is supplied through the tube 310 into the portion of bread dough 320, the volume of the bread dough 320 expands, due to the formation of an air pocket 321 inside the bread dough 320. The volume of the mold 330 also expands, but is controlled by at least one arm 350, so that the bread dough 320 inside the mold 330 does not expand unevenly or excessively, which may cause the bread dough 320 to rupture.

Cooking can be performed inside the housing 330 by heating the housing 330 to a desirable cooking temperature. In preferred embodiments, the dough imbedded with the insert is baked in an oven at temperatures under which bread dough 320 can at least partially harden, but less than 250° C. to prevent excessive crusting and bubbling. After cooking, the bread dough 320 is removed from the housing 330 and from the tube 310. Alternatively, cutting can be performed while the bread dough 320 is still inside the housing 330. The bread dough 320 is cut along line 322 into at least two pieces (323 and 325). One piece 323 has a cavity 324, and the other piece 325 also has a cavity 326. Preferably, line 322 is off the center so that the volume of one cavity 324 at least 50% larger than the volume of the other cavity 326.

Figure 4:
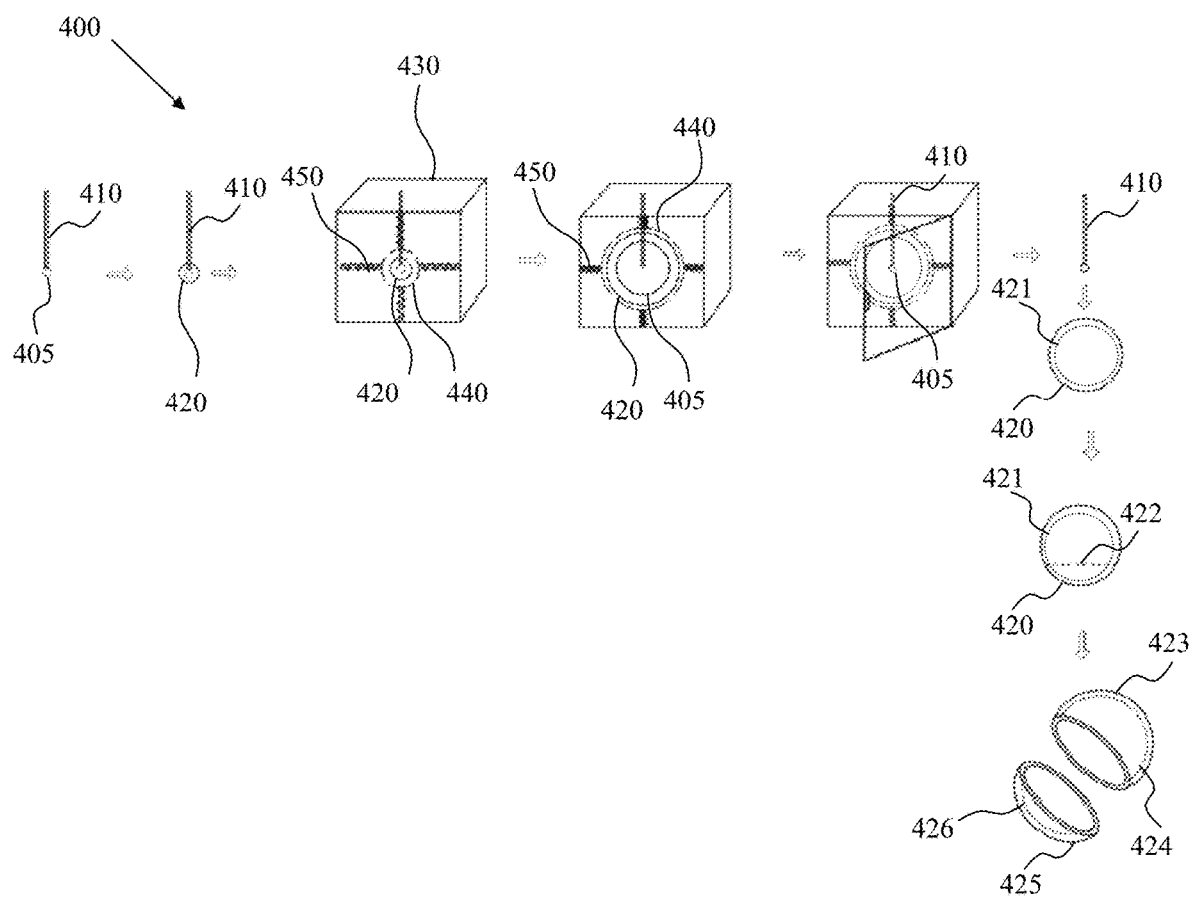
FIG. 4 shows an embodiment of a device that can be used to produce a pocketed bread bun, with an expandable object (e.g., a balloon or a mechanical device).

FIG. 4 shows an embodiment of a device 400 that can be used to produce a pocketed bread bun with the addition of an expandable object 405. Contemplated expandable objects include a balloon, or an expandable ball. The expandable object 405 is connected to one end of a tube 410 and is placed inside a portion of bread dough 420. The portion 420 is then placed inside an expandable mold 440 inside a housing 430. Alternatively, the tube 410 with the expandable object 405 is already inside the housing 430 before the portion of bread dough 420 is placed inside the housing 430.

As compressed air is supplied through the tube 410 into the expandable object 405, the volume of the expandable object 405 expands inside the portion of bread dough 420, causing the volume of the bread dough 420 to expand. The volume of the mold 430 also expands, but is controlled by at least one arm 450, so that the bread dough 420 inside the mold 430 does not expand unevenly or excessively, which may cause the bread dough 420 to rupture. Cooking can be performed inside the housing 430 by heating the housing 430 to a desirable cooking temperature, so that the bread dough 420 can at least partially harden.

After cooking, the expandable object 405 reduces its size so that it can be removed from the bread dough 420. The space used to be occupied by the expandable object 405, i.e., air pocket 421, now becomes a hollow center inside the bread dough 420. The bread dough 420 is then removed from the housing 430 and is cut along line 422 into at least two pieces (423 and 425). One piece 423 has a cavity 424, and the other piece 425 also has a cavity 426. Preferably, line 422 is off the center so that the volume of one cavity 424 at least 50% larger than the volume of the other cavity 426. Alternatively, cutting can be performed while the bread dough 420 is still inside the housing 430.

Figure 5:
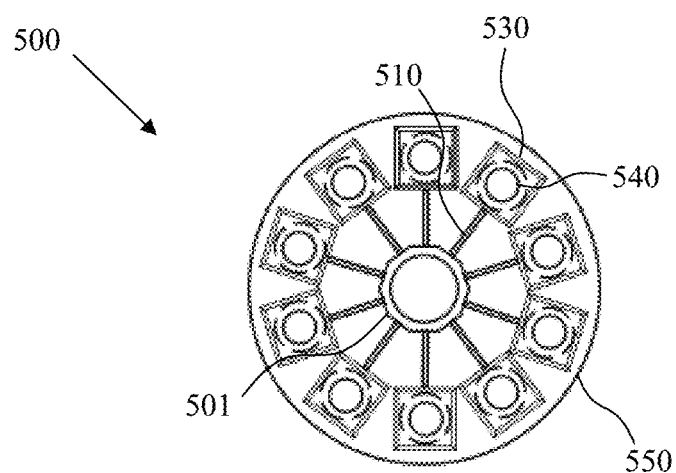
FIG. 5 shows an embodiment of a device comprising a chamber with 10 molds inside and an air source positioned in the center.

FIG. 5 is an embodiment of a device 500 that can be used to simultaneously produce multiple pocketed buns. The device 500 has multiple molds (e.g., 530), for example, ten molds shown in this particular embodiment. A tube 510 connects the mold 530 with an air source 501 (e.g., air compressor or gas cylinder) that is preferably and advantageously located in the center, so that the least amount of tube 510 needs to be used. The molds (e.g., 530) are housed inside a chamber 550, which can be stacked on top another similar or identical chamber to utilize space for maximum efficiency.

Figure 6:
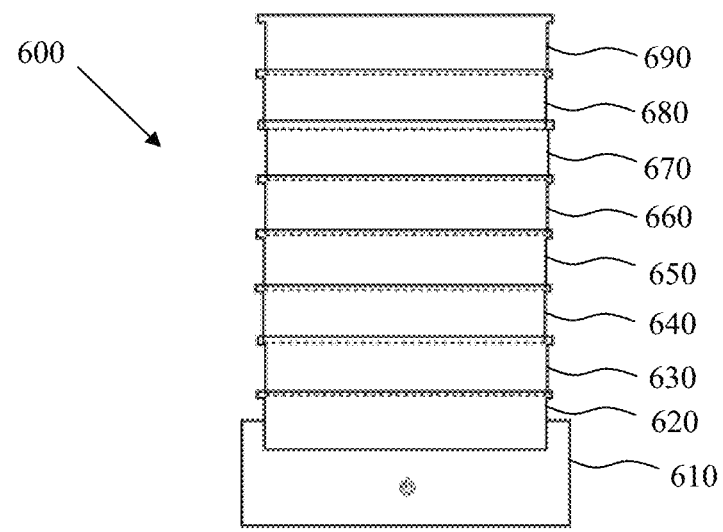
FIG. 6 shows an embodiment of a device having 9 levels, each level having multiple molds, and a bottom level having a heat source.

FIG. 6 is an embodiment of a multi-level device 600 with that can be used to simultaneously produce multiple pocketed buns. Device 600 can comprise multiple chambers 550 in FIG. 5, with one chamber stacked on top another. In this particular embodiment shown, eight chambers (620-690) are stacked one on top of another. Alternatively, device 600 can comprise a shelf having multiple floors to support the chambers. A heat source 610 is strategically positioned at the bottom floor of the device 600, since heat (e.g., hot air or hot steam) travels up naturally. It is contemplated that the device 600 can have a water container to supply water (i.e., moisture) for cooking.

It should be apparent to those skilled in the art that many more modifications besides those already described are possible without departing from the inventive concepts herein. The inventive subject matter, therefore, is not to be restricted except in the spirit of the appended claims.

What is claimed is:

1. A method for producing a pocketed bun, comprising:
   supplying air into a portion of bread dough through a tube to produce an air pocket;
   cooking the portion to produce an at least partially cooked bun; and
   cutting the bun into at least a first piece having a first cavity and a second piece having a second cavity, wherein each of the first and second cavities are at least partially formed from the air pocket.

2. The method of claim 1, wherein the portion of bread dough comprises at least 2% oil by weight, inclusive.

3. The method of claim 1, wherein the step of supplying air comprises supplying air to a balloon.

4. The method of claim 1, wherein the step of supplying air comprises supplying air to an expandable device, other than a balloon.

5. The method of claim 1, wherein the step of supplying air comprises supplying air directly inside the portion of bread dough, to produce the air pocket without using any additional balloon or other expanding object.

6. The method of claim 1, further comprising using a compressor to compress ambient atmospheric air for use in the step of supplying air.

7. The method of claim 1, wherein the air pocket has an eccentricity of at least 2:1, inclusive.

8. The method of claim 1, wherein the air pocket has a volume of at least 100 cm$^2$, inclusive.

9. The method of claim 1, wherein the air pocket has a volume at least 40% of a volume of the bun, including the air pocket, inclusive.

10. The method of claim 1, wherein the step of supplying air occurs entirely prior to the step of cooking.

11. The method of claim 1, wherein the step of supplying air occurs at least partially during the step of cooking.

12. The method of claim 1, further comprising placing the portion of bread dough into an expandable mold prior to the step of supplying air into the portion.

13. The method of claim 12, further comprising using a processor to operate at least a first arm to control expansion of the mold.

14. The method of claim 1, further comprising removing the tube after the step of cooking has begun.

15. The method of claim 1, wherein the first cavity has a volume at least twice as large as the second cavity.

16. A method of producing a pocketed bun, comprising:
   placing a balloon inside a portion of bread dough;
   inflating the balloon;
   cooking the portion of bread dough to produce an at least partially bun;
   deflating the balloon and removing the balloon from the bun; and
   cutting the bun into at least a first piece having a first cavity, and a second piece having a second cavity.

* * * * *